US006348305B2

(12) United States Patent
Puppo et al.

(10) Patent No.: US 6,348,305 B2
(45) Date of Patent: Feb. 19, 2002

(54) PHOTOGRAPHIC ELEMENT WITH A LAYER IMPROVING THE ADHESION TO THE SUPPORT BASE

(75) Inventors: Paola Puppo, Genoa; Alberto Valsecchi; Carlo Barlocco, both of Savona, all of (IT)

(73) Assignee: Ferrania, S.p.A., Ferrania (IT)

( * ) Notice: Subject to any disclaimer, the term of this patent is extended or adjusted under 35 U.S.C. 154(b) by 0 days.

(21) Appl. No.: 09/770,011

(22) Filed: Jan. 25, 2001

(30) Foreign Application Priority Data

Feb. 15, 2000 (IT) ........................................ SV200A004

(51) Int. Cl.[7] ............................ G03C 1/93; G03C 1/85; G03C 1/795; B32B 27/00; B32B 27/40

(52) U.S. Cl. ........................ 430/527; 430/531; 430/533; 428/420; 428/423.1; 428/423.5; 428/423.7; 428/425.5

(58) Field of Search ................................ 430/531, 533, 430/527; 428/420, 423.5, 425.5, 423.7, 423.1

(56) References Cited

U.S. PATENT DOCUMENTS

| | | | | | |
|---|---|---|---|---|---|
| 4,689,359 | A | | 8/1987 | Ponticello et al. | 524/23 |
| 4,695,532 | A | | 9/1987 | Ponticello et al. | 430/533 |
| 4,902,593 | A | * | 2/1990 | Vermeulen et al. | 430/533 |
| 5,194,347 | A | * | 3/1993 | Vermeulen et al. | 430/533 |
| 5,204,219 | A | | 4/1993 | Van Ooij et al. | 430/531 |
| 5,378,592 | A | | 1/1995 | Nakanishi et al. | 430/533 |
| 5,451,495 | A | * | 9/1995 | Falkner et al. | 430/531 |
| 5,510,233 | A | | 4/1996 | Nakanishi et al. | 430/533 |
| 5,532,118 | A | | 7/1996 | Bauer et al. | 430/533 |
| 5,639,589 | A | | 6/1997 | Bauer et al. | 430/531 |
| 5,707,791 | A | | 1/1998 | Ito et al. | 430/531 |
| 5,726,001 | A | | 3/1998 | Eichorst | 430/531 |
| 6,187,524 | B1 | * | 2/2001 | Park | 430/531 |

* cited by examiner

*Primary Examiner*—Richard L. Schilling
(74) *Attorney, Agent, or Firm*—Mark A. Litman & Assoc. P.A.

(57) ABSTRACT

A photographic element comprising a film support base, an adhesion promoting layer, a subbing layer and at least one light-sensitive silver halide emulsion layer, wherein the adhesion promoting layer is close to the support and contains a silane compound and a polyurethane, and the subbing layer, selected within the group consisting of a hydrophilic colloidal layer or a layer comprising a continuous gelled network of inorganic particles, is positioned between the adhesion promoting layer and the emulsion layer.

The present invention also refers to a photographic element comprising a film support base having coated on one side thereof at least one light-sensitive silver halide emulsion layer and on the opposite side thereof an adhesion promoting layer and at least one auxiliary layer, wherein the adhesion promoting layer is close to the support and contains a silane compound and a polyurethane.

The present invention further refers to a film support base having coated on at least one side thereof an adhesion promoting layer and a subbing layer, wherein the adhesion promoting layer is close to the support and contains a silane compound and a polyurethane and the subbing layer is selected within the group consisting of a hydrophilic colloidal layer or a layer comprising a continuous gelled network of inorganic particles.

Finally, the present invention also refers to a film support base having coated on one side thereof an adhesion promoting layer and at least an auxiliary layer, wherein the adhesion promoting layer is close to the support and contains a silane compound and a polyurethane binder and the auxiliary layer is an antistatic layer, a magnetic layer, a protective layer or a lubricant layer.

The adhesion of the emulsion layers and/or of the auxiliary layers to the support base is improved both under wet and dry conditions.

20 Claims, No Drawings

PHOTOGRAPHIC ELEMENT WITH A LAYER IMPROVING THE ADHESION TO THE SUPPORT BASE

BACKGROUND OF THE INVENTION

1. Field of the Invention

This invention relates to photographic elements having a film support carrying an adhesion promoting layer on at least one side thereof 2. Background of the Art Polyester film-forming materials have been used as supports in photographic materials due to their many favorable properties, including their excellent transparency. Polyester supports, such as polyethylene terephthalate (PET) and polyethylene naphthalate (PEN), triacetyl cellulose, polystyrene, polycarbonate and polyolefin laminate are examples of common polyesters. However, such polymer films have a hydrophobic surface and therefore, when the polymer is employed as the base film of the support for a photographic material, it is difficult to firmly bond to the support a photographic emulsion layer comprising a hydrophilic polymer (hydrophilic colloid), especially where mainly containing gelatin.

Two processes have been utilized as conventional techniques to overcome the above difficulty:

(1) a process in which a photographic emulsion layer is directly formed on the support to obtain a high bonding strength after having provided the support with a surface activation treatment (such as a corona discharge treatment, a glow discharge treatment, an active plasma treatment, a chemical treatment, a mechanical treatment, a UV treatment and equivalent processes); and (2) a process in which an adhesion promoting layer is provided on the support subjected to the above surface treatment by coating, and then a photographic emulsion layer is formed thereon.

The latter process is effective and is widely performed commercially.

It is assumed that surface treatments are effected by forming some polar groups on a surface of a base film (which is originally hydrophobic) and by increasing a cross linking density on that surface, and as a result, it is considered that the affinity of the components contained in the adhesion promoting layer with the polar group is increased or the bonding strength between the adhesion promoting layer and the base film is enhanced.

Some useful compositions for adhesion promoting layers include polymers containing vinylidene chloride such as vinylidene chloride/methyl acrylate/itaconic acid terpolymers or vinylidene chloride/acrylonitrile/acrylic acid and the like; butadiene-based copolymers, glycidyl acrylate or methacrylate containing copolymers; or maleic anhydride-containing copolymers. These and other suitable compositions described, for example, in U.S. Pat. Nos. 2,627,088; 2,698,240; 2,943,937; 3,143,421; 3,201,249; 3,271,178; 3,443,950 and 3,501,301 provide the required adhesion when applied before orientation but are not effective when applied on oriented support. The effectiveness of these adhesive materials may be enhanced by the use of swelling or attack agents in the compositions, such materials, for example, including resorcinol.

An alternative approach to improving the enhancement of adhesion between the film support and gelatin layers disclosed in U.S. Pat. No. 4,695,532 is described as a discharge-treated polyester film support having coated directly thereon a crosslinked layer of an aqueous vinyl acrylate copolymer and gelatin. Although this system has good adhesion before processing, the adhesion performance is severely degraded by photographic developing solutions.

U.S. Pat. No. 4,689,359 discloses a polymer composition comprising (a) 1 to 60 wt. % of recurring units derived from a vinyl monomer having a primary amine addition salt component and/or a vinyl monomer having an aminostyrene addition salt component; (b) 0 to 50 wt. % of recurring units derived from a hydrophilic vinyl monomer and (c) 20 to 98 wt. % of recurring units from a hydrophobic non-ionic vinyl monomer. The polymers are useful in aqueous coating compositions, particularly for coating onto discharge-treated polyester film supports to form cross-linked layers to promote adhesion between the film support and the other emulsion layers in photographic elements such as silver halide emulsion layers. U.S. Pat. No. 5,639,589 and EP Application 729,063 describe polyester photographic film supports comprising a surface coated with a subbing layer comprising a mixture of gelatin and the same polymer composition described in U.S. Pat. No. 4,689,359. High dry adhesion, even with a thinner subbing layer and/or a higher gelatin:polymer ratio, is obtained.

U.S. Pat. No. 5,532,118 discloses photographic elements comprising a polyester film support having coated thereon a self-crosslinking polyurethane derived from an isocyanate terminated prepolymer extended with an aliphatic polyamine and end-capped with N-methylol hydrazide groups, the prepolymer being derived from a diisocyanate and a polyester polyol and having carboxylic salt groups on the polymer chain. The photographic element disclosed therein exhibits good wet and dry adhesion, before and after photographic processing.

U.S. Pat. No. 5,510,233 discloses a photographic material having a first and a second adhesion promoting layer and an emulsion layer coated in this order on the same side of a polyester support base, in which the first adhesion promoting layer is a hardened layer comprising a polyurethane latex and an ethoxy compound or a dichloro-s-triazine derivative, and the second adhesion promoting layer is a hydrophilic colloidal layer substantially consisting of gelatin. The polyurethane latex has breaking elongation lower than or equal to 300% or a tensile stress of at least 130 $kg/cm^2$ at 100% elongation. The composition of the adhesion promoting layers improves adhesion between the emulsion layer and the support and prevents delamination even under prolonged storage at high humidity condition. It also prevents the coated emulsion from cracking even at extremely low humidity storage. An additional advantage is the resistance against reticulation at the processing and the background clarity of the processed images.

U.S. Pat. No. 5,378,592 discloses a photographic material comprising a support of a polyester film, a first subbing layer provided thereon, a second subbing layer comprising gelatin provided on the first subbing layer and a photographic layer provided on the second subbing layer. The first subbing layer is a layer of polymer latex cured with an epoxy-type compound or a dichloro-s-triazine derivative, or the first subbing layer comprises a polymer which has a breaking elongation lower than or equal to 300% or a tensile stress of at least 130 $kg/cm^2$. In particular, the photographic material contains an epoxy compound having not less than 4 epoxy groups (preferably 4 to 5).

U.S. Pat. No. 5,726,001 discloses a composite support comprising a polymeric film having coated thereon an electrically conductive layer and an auxiliary layer coated over the electrically conductive layer, wherein the polymeric film comprises a surface which has been activated by energetic treatment, and wherein the composite support further comprises an adhesion promoting layer comprising an aqueous dispersible, aliphatic, anionic polyurethane binder having a breaking elongation of at least 350% either between the polymeric film and the electrically conductive layer or between the electrically conductive layer and the auxiliary layer, and the electrically conductive layer or adhesion promoting layer is in contiguous contact with the activated surface of the polymeric film. The invention provides composite supports and imaging elements containing an electrically conductive antistatic layer having excellent adhesion to energetic surface-treated polymer film supports, and of auxiliary layers to the electrically conductive antistatic layer.

U.S. Pat. No. 5,707,791 discloses a silver halide photographic light-sensitive material with excellent adhesive property and scratch-resistance comprising: (a) a polyester support; (b) a silver halide emulsion layer coated on one side of said polyester support; (c) a resin layer coated on the other side of said polyester support, said resin layer comprising an antistatic agent selected from the group consisting of a conductive polymer and a metal oxide, and a resin selected from the group consisting of an aqueous-dispersible polyester resin and an aqueous-dispersible polyurethane resin; and (d) a magnetic layer coated on said resin layer.

U.S. Pat. No. 5,204,219 discloses a polymeric film having adhered to at least one surface thereof a layer comprising a continuous gelled network of inorganic particles containing from 0.1 to 20% by weight of solid content of said layer of an ambifunctional silane, where the term ambifunctional silane means that the compound has reactive silanes on one end of the molecule and a different reactive species capable of reacting with a photographic hardener for gelatin or directly with gelatin. This second functionality enables the compound to react with the inorganic particle (through the silane group) and also react with the gelatin (reacting with the gelatin hardener which also reacts with the gelatin).

However, it is still desirable to provide polyester film supports having improved adhesion of emulsion layers coated thereon both in wet and dry conditions.

SUMMARY OF THE INVENTION

A photographic element comprises a film support base, an adhesion promoting layer, a subbing layer and at least one light-sensitive silver halide emulsion layer. The adhesion promoting layer is close to the support and contains a silane compound and a polyurethane, and the subbing layer (selected within the group consisting of a hydrophilic colloidal layer or a layer comprising a continuous gelled network of inorganic particles) is positioned between the adhesion promoting layer and the emulsion layer.

The present invention also refers to a photographic element comprising a film support base having coated on one side thereof at least one light-sensitive silver halide emulsion layer and on the opposite side thereof an adhesion promoting layer and at least one auxiliary layer, wherein the adhesion promoting layer is close to the support and contains a silane compound and a polyurethane.

The present invention further refers to a film support base having coated on at least one side thereof an adhesion promoting layer and a subbing layer, wherein the adhesion promoting layer is close to the support and contains a silane compound and a polyurethane and the subbing layer is a hydrophilic colloidal layer comprising a continuous gelled network of inorganic particles.

Finally, the present invention also refers to a film support base having coated on one side thereof an adhesion promoting layer and at least an auxiliary layer, wherein the adhesion promoting layer is close to the support and contains a silane compound and a polyurethane binder and the auxiliary layer is an antistatic layer, a magnetic layer, a protective layer or a lubricant layer.

The adhesion of emulsion layers and/or of auxiliary layers to the support base is improved under both wet and dry conditions.

DETAILED DESCRIPTION OF THE INVENTION

The layers of the photographic element can be coated on a variety of supports, such as cellulose ester supports (e.g., cellulose triacetate supports), paper supports, polyester film supports (e.g., polyethylene terephthalate or PET film supports and polyethylene naphthalate or PEN film supports), and the like, as described in Research Disclosure 308119, Section XVII, 1989. Preferred supports are the polyester film supports prepared from any of the polyester compositions described, for example, in U.S. Pat. Nos. 2,943,937 or 2,627,088. Among the suitable polyesters for use as supports include those prepared from dicarboxylic acids or derivatives thereof, such as terephthalic acid, isophthalic acid, 2,6-naphthalene dicarboxylic acid, 2,7-naphthalene dicarboxylic acid, adipic acid, succinic acid and mixtures thereof and glycols, such as, ethylene glycole, propylene glycole, butylene glycole, hexamethylene glycole, cyclohexane diol and mixtures thereof. Especially useful polyester film supports are polytethylene terephthalate (PET) or polyethylene naphthalate (PEN).

The supports preferably are initially treated with a surface activation treatment such as, for example, a corona discharge treatment, a glow discharge treatment, an active plasma treatment, a chemical treatment, a mechanical treatment, a UV treatment, a flame treatment, and the like. The preferred methods are corona discharge treatment, as described, for example, in U.S. Pat. Nos. 4,055,685; 4,135,932; 4,220,471 and 5,194,291; and glow discharge treatment as described, for example, in U.S. Pat. Nos. 3,288,638; 4,451,497; 4,933,267 and 5,425,980.

Light-sensitive photographic elements generally consist of a film support base coated with at least one silver halide emulsion layer on one side thereof and auxiliary layers on the other side of the support. The adhesion promoting layer of the present invention is close to the support and it may be applied on the emulsion side or on the side opposite thereto.

The adhesion promoting layer may be applied to the film support either during or after the preparation of the film support. That is, in the preparation of film supports, the polymer is melt extruded into a sheet and subsequently oriented by stretching it in both longitudinal and transversal directions and then treated by several steps including heat treating, heat relaxing, annealing and the like. The adhesion promoting layer may be applied at any stage in the known process of preparing photographic film base, such as prior to orienting, between the orienting steps, or before or after any of the subsequent steps in the preparation of the support. The application of the adhesion promoting layer is particularly advantageous after completion of the support.

Polyurethane compounds have been known since the discovery in 1937 of diisocyanate addition polymerization. The term polyurethane compound does not mean a polymer that only contains urethane groups, but means all those polymers that contain significant numbers of urethane groups, regardless of what the rest of the molecule may be. Homopolymers of isocyanates are usually referred to as isocyanate polymers. Usually polyurethane compounds are obtained by the reaction of polyisocyanates with polyhydroxy compounds, such as polyethers, polyester, castor oils, or glycols, but compounds containing groups such as amino and carboxyl groups may also be used. Thus, a typical polyurethane compound may contain in addition to urethane groups aliphatic and aromatic hydrocarbon residues, ester groups, ether groups, amide groups, urea groups, and the like. The urethane group has the following characteristic structure:

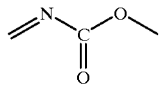

and polyurethane compounds have a significant number of these groups, although they do not necessarily repeat in a regular order. The most common method of forming polyurethane compounds is by reacting di- or polyfunctional hydroxy compounds, such as hydroxyl-containing (e.g., terminated) polyesters or polyethers, with di- or polyfunctional isocyanates. Examples of useful diisocyanates are represented by the following formula:

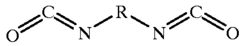

wherein R can be represented by substituted or unsubstituted alkylene, cycloalkylene, arylene, alkylenebisarylene, arylenebisalkylene, etc. groups. Examples of disocyanates within the formula above are 2,4-tolylene diisocyanate, 2,6-tolylene diisocyanate, 4,4'-diphenylmethane diisocyanate, dianisidine diisocyanate, toluidine diisocyanate, naphthylene diisocyanate, hexamethylene diisocyanate, m-xylydene diisocyanate, pyrene diisocyanate, isophorone diisocyanate, ethylene diisocyanate, propylene diisocyanate, octadecylene diisocyanate, methylenebis (4-cyclohexyl isocyanate) and the like.

Examples of di- or polyfunctional hydroxy compounds are hydroxyl-containing polyethers and polyesters having a molecular weight of from 200 to 20,000, preferably of from 300 to 10,000. Most of the polyethers used for the manufacture of polyurethanes are derived from polyols and/or poly(oxyalkylene) derivatives thereof Examples of useful polyols include: 1) diols such as alkylene diols of 2–10 carbon atoms, arylene diols such as hydroquinone, and polyether diols $[HO(RO)_nH]$ where R is alkylene, 2) triols such as glycerol, trimethylol propane, 1,2,6-hexanetriol, 3) tetraols such as pentaerythritol, and 4) higher polyols such as sorbitol, mannitol, and the like. Examples of polyesters used for the manufacture of polyurethanes are saturated polyesters having terminal hydroxy groups, low acid number and low water content, derived from adipic acid, phthalic anhydride, ethylene glycol, propylene glycol, 1,3-butylene glycol, 1,4-butylene glycol, diethylene glycol, 1,2,6-hexanetriol, trimethylolpropane, trimethylolethane, and the like. Other desirable polyols include castor oil (a mixture of esters of glycerol and fatty acids, the most relevant thereof is the ricinoleic acid), lactones having end hydroxyl groups (such as polycaprolactone), and block copolymers of propylene and or ethylene oxide copolymerizered with ethylenediamine.

Polyurethane dispersions are well-known in the art; in fact, they have been disclosed, for example, in U.S. Pat. Nos. 2,968,575, 3,213,049, 3,294,724, 3,565,844, 3,388,087, 3,479,310 and 3,873,484. Polyurethane products commercially available are, for example, Neorez™ R551 sold by Zeneca Resins, Sancure™ 1301 and Sancure™ 2710 sold by BF Goodrich, Witcobond™ series produced by Witco Chemical Co., Takelak™ XW-76-P15 produced by Takeda Yakuhin Kogyo and Bahydrol™ produced by Bayer.

Useful polyurethane dispersions are neutral or they are anionically or cationically stabilized. Anionically or cationically stabilized dispersions are formed by incorporating charged groups into the polyurethane molecule. Useful groups which impart a negative charge to the dispersion include carboxylate, sulfonate and the like. Useful repeating units are derived from polyol monomers containing these acidic functional groups such as 2,2-bis(hydroxymethyl)-propionic acid, N,N-bis-(2-hydroxyethyl)-glycine and the like. Among useful groups that impart a positive charge to the dispersion include quaternized amines, sulfonium salts, phosphinates and the like. Useful repeating units are derived from polyol monomers containing a tertiary amine or a thio-functional group such as N-methyldiethanolamine, 2,2'-thioethanol and the like. Useful examples of anionically and cationically stabilized polyurethane dispersions are disclosed in U.S. Pat. Nos. 3,479,710 and 3,873,484.

Any method known in the art for the preparation of a polymeric dispersion can be used for the preparation of polyurethane dispersions useful in the present invention. In a preferred embodiment, polyurethane dispersions are prepared by polymerization in emulsion. By this method, polyurethane dispersions are prepared by extending of a prepolymer chain, the prepolymer being the reaction product of an isocyanate with an organic compound having at least two reactive hydrogen atoms. Organic compounds having at least two reactive hydrogen atoms include the above-mentioned bis- or polyfunctional hydroxy compounds. Polyurethane dispersions are generally prepared by emulsifying the prepolymer and then extending the chain in the presence of a chain extending agent.

The prepolymer is prepared by mixing the organic compounds having at least two reactive hydrogen atoms and the diisocyanate compound, in nitrogen atmosphere and then stirring. A useful temperature is comprised in the range between about 25° C. and 110° C. The reaction is preferably done in the presence of a solvent and, additionally, of a catalyst. Useful solvents include ketones and esters, aliphatic hydrocarboxy solvents such as heptane, octane, etc., and cycloaliphatic hydrocarbons such as methylcycloesane, etc. Useful catalysts include tertiary amines, acids and organometallic compounds such as triethylamine, stannous chloride, and di-n-buthyl tin dilaurate. When both the reagents and the prepolymer are in liquid form, the organic solvent may be absent.

Following the prepolymer preparation, the dispersion is prepared by emulsifying the prepolymer and extending the chain thereof in the presence of water and, optionally, of a surfactant. When the prepolymer contains charged groups, the addition of a surfactant may be unnecessary. The prepolymer chain extending is realized by adding a chain extending agent to the emulsified prepolymer. Useful chain extending agents include water, hydrazine, primary and secondary diamines, aminoalcohols, aminoacids, hydroxyacids, diols or mixtures thereof. A preferred group of chain extending agents include water and primary and secondary diamines, such as 1,4-cyclohesanbis (methylamine), ethylendiamines, diethylenetriamines, etc., the molar amount of the chain extending agent being typically equal to the equivalents of the isocyanate of the prepolymer.

The adhesion promoting layer preferably is coated at a polyurethane coverage of from about 0.01 to 1 g/m$^2$, more preferably 0.015 to 0.5 g/m$^2$.

The silane compounds useful in the present invention are ambifunctional silane compounds represented by the formula (Q)n-R—Si—(OR')$_3$, wherein R is an organic group having n+1 valences or bonds, R' is alkyl or aryl, Q is a moyety capable of reacting with the support or the coated primer on the support, n is 1, 2 or 3. Q is preferably an epoxy group or an amino group (primary or secondary). Preferred ambifunctional silane compounds contained in the adhesion promoting layer of the present invention include epoxy-silanes and amino-silanes, as described in U.S. Pat. Nos. 5,204,219 (Van Ooij et al.), 5,439,789 (Boston et al.); U.S. Pat. No. 5,411,787 (Kulkarni et al.); and U.S. Pat. No. 5,882,466 (Grootaert et al.).

Preferred epoxy-silane compounds useful in the present invention are γ-glycidoxy-propyl-trimethoxy-silane, and β-(3,4-epoxycyclohexyl)ethyl-trimethoxy-silane. These epoxy-silane compounds can be prepared according to methods known in the art, such as for example the methods described in W. Noll, Chemistry and Technology of Silicones, Academic Press (1968), pp. 171–34 and in Journal of American Chemical Society, vol. 81 (1959). p. 2632.

Epoxy-silane compounds may be added to the adhesion promoting layer as neat liquids, as solids, or as solutions in suitable solvents. The epoxy-silane compounds may be hydrolyzed completely or partially before addition. By “partially hydrolyzed,” it is meant that not all of the hydrolyzable silicon-alkoxide (alkoxy-silane) or silicon-carboxylate groups have been removed from the silane upon reaction with water. Hydrolysis of epoxy-silane compounds is conveniently done in the presence of water and a catalyst such as an acid, a base, or a fluoride ion. The hydrolyzed epoxy-silane compounds may exist as siloxane polymers or oligomers resulting from condensation of silanol groups produced in the hydrolytic reaction of the epoxy-silane compound with other silanol groups or with unreacted silicon-alkoxide or silicon-carboxylate bonds. It may be desirable to add epoxy-silane compounds in the form of co-hydrolysates or co-hydrolysates and co-condensates with other, non-epoxy-silane compounds.

Useful amino-silane compounds include, for example, 3-amino-propyl-trimethoxy-silane, 3-aminopropyl-triethyoxy-silane, addition products of 3-glycidoxypropyl-alkoxy-silane and secondary hydroxy alkylamines, and mixtures thereof. Amino-silane compounds, are further described in U.S. Pat. No. 5,411,787 (Kulkarni et al.) and can be further blended with other silane coupling agents, such as methyl-trimethoxy-silane, dimethyl-diethoxy-silane, methacrylolpropyl-trimethoxy-silane, dialkylamine addition products of glycidoxypropyl-alkoxysilane, and tripropylamine addition products of glycidoxypropyl-dimethoxy-silane. Other examples of useful aminosilane compounds include, for example, 3-aminopropyl-triethoxy-silane, N-(2-aminoethyl)-3-aminopropyl-trimethoxy-silane, N-(2-vinylbenzylamino)ethyl-3-aminopropyl-trimethoxy-silane, 4-aminobutyl-triethoxy-silane, (aminoethyl-aminomethyl) phenethyl-trimethoxy-silane, β-(2-aminoethyl)-3-aminopropylmethyl-dimethoxy-silane, β-(2-aminoethyl)-3-aminopropyl-tris(2-ethyl-hexoxy)-silane, 6-(aminohexylaminopropyl)-trimethoxy-silane, p-aminophenyl-trimethoxy-silane, 3-(1-aminopropoxy)-3,3-dimethyl-1-propenyl-tri-methoxy-silane, 3-aminopropyltris (methoxyethoxyethoxy)-silane, 3-amino-propylmethyl-diethoxy-silane, 3-aminopropyl-triethoxy-silane, 3-aminopropyl-trimethoxy-silane, ω-aminoun-decyl-trimethoxy-silane, and those further described in U.S. Pat. No. 5,882,466 (Grootaert et al.).

The ambifunctional silane compounds as described above, can be present in the adhesion promoting layer in any amount that will provide effective adhesion-promoting properties. For example, the adhesion promoting layer can contain a polyurethane binder to silane compounds ratio from 1:1 to 100:1, preferably from 5:1 to 20:1. Further, for example, the ambifunctional silane compound is contained in the adhesion promoting layer in an amount from about 1 to about 50 parts by weight, preferably from 5 to 20 parts by weight, based on 100 parts of the adhesion promoting layer.

A primer layer may be used between the support itself and the adhesion promoting layer, as known in the art. Primer layers are, in fact, generally considered to be part of the support itself unless specifically excluded in the description (e.g., unprimed polyester). Primer compositions are well known in the art and include polymers of vinylidene chloride, diazo compounds, acrylic resins crosslinked with melamine resins, and polyester resins.

When the adhesion promoting layer is applied on the emulsion side, a subbing layer is directly bonded to the adhesion promoting layer and is positioned between the adhesion promoting layer and the silver halide emulsion layer in order to better improve the adhesion of the emulsion layer to the adhesion promoting layer. Subbing layers include hydrophilic colloid layers or layers comprising a continuous gelled network of inorganic particles.

Suitable hydrophilic colloidal materials include both naturally occurring substances such as proteins, protein derivatives, cellulose derivatives such as cellulose esters; gelatin including alkali-treated and acid-treated gelatin, phthalated gelatin, and the like; polysaccharides such as dextran, gum arabic, zein, casein, pectin, collagen derivatives, collodion, agar-agar, arrowroot, albumin and the like. The hydrophilic colloidal layer composition preferably comprises a dispersion of the hydrophilic colloid in water at a percentage of at least 2% by weight of the resulting composition. Gelatin is the most preferred hydrophilic colloid. Other hydrophilic colloidal materials which can be used include poly(vinyllactams), acrylamide polymers, polyvinyl alcohol and its derivatives, polyvinyl acetals, polymers of alkyl and sulfoalkyl acrylates and methacrylates, hydrolyzed polyvinyl acetates, polyamides, polyvinyl pyridine, acrylic acid polymers, maleic anhydride copolymers, polyalkylene oxides, methacrylamide copolymers, polyvinyl oxazolidinones, maleic acid copolymers, vinylamine copolymers, methacrylic acid copolymers, acryloyloxyalkylsulfonic acid copolymers, sulfoalkylacrylamide copolymers, polyalkyleneimine copolymers, polyamines, N,N-dialkylaminoalkylacrylates, vinyl imidazole copolymers, vinyl sulfide copolymers, halogenated styrene polymers, aminoacrylamide polymers, polypeptides, and the like. Other exemplary colloids are disclosed, for example in U.S. Pat. Nos. 2,691,582; 2,787, 545; 2,956,880; 3,132,945; 3,138,846; 3,679,425; 3,706, 564; 3,813,251; 3,852,073; 3,879,205; 3,003,879; 3,284, 207; 3,748,143 and 3,536,491.

Suitable layers comprising a continuous gelled network of inorganic particles are disclosed in U.S. Pat. No. 5,204,219. Inorganic metal oxides particularly suitable are those in which the metal oxide particles are negatively charged and include tin oxides, titanium oxides, antimony oxides, silica, and alumina-coated silica, as well as other inorganic metal oxides of Groups III and IV of the Periodic Table and mixtures thereof The selection of the inorganic metal oxides is dependent upon the ultimate balance of properties desired.

Inorganics such as silicon nitride, silicon carbide, and magnesium fluoride, when provided in sol form, are also useful.

When the adhesion promoting layer is coated on the polyester film support base on the side opposite to the emulsion side, auxiliary layers including, for example, antistatic layers, anti-halation layers, magnetic layers, protective or lubricant layers can be directly overcoated onto the adhesion promoting layer, with or without the need of a subbing layer. Antistatic layers and anti-halation layers are disclosed, for example, in Research Disclosure, Item 17643, December 1978 to prevent undesirable static discharges during manufacture, exposure and processing of the imaging element. Antistatic layers conventionally used in color films have been found to be satisfactory used herewith. Any of the antistatic agents described, for example, in U.S. Pat. Nos. 4,374,924; 4,943,520; 5,147,768 and 5,582,963 can be used. Preferred antistatic agents include metal oxides, such as, for example, tin oxide, antimony doped tin oxide, vanadium pentoxide, antimony doped vanadium pentoxide, silver doped vanadium pentoxide and mixtures thereof as described, for example, in U.S. Pat. Nos. 5,407,603; 5,427,835; 5,439,785; 5,468,498 and 5,709,985. Transparent magnetic recording layers as described, for example, in U.S. Pat. Nos. 5,147,768; 5,215,874; 5,217,804; 5,250,404 and 5,395,743, are useful to record magnetic information. Ferromagnetic particles are generally employed in such magnetic layers. Protective or lubricating layers can contain known compounds such as, for example, suitable lubricants including silicone oil, silicones having polar groups, higher fatty acid glycerides, higher alcohol esters of higher fatty acids, waxes, alcohols, polyolefins, alkyl phosphates, alkyl sulfates, siloxanes and the like, as described, for example, in EP Patent Applications 751,423; 833,194 and 855,619 and in U.S. Pat. Nos. 5,723,270; 5,747,234; 5,766,836; U.S. Pat. Nos. 5,821,027; 5,843,631 and 5,491,051.

Suitable silver halide emulsions can be any of the silver halide emulsions known in the art, such as silver chloride, silver bromide, silver bromo-chloride, silver chloro-iodide, silver bromo-iodide, silver chloro-bromo-iodide emulsions and mixtures thereof The emulsions can be composed of coarse, medium and fine grains and can be monodispersed or polydispersed. The silver halide grains may be those having a regular crystal form, such as a cube or an octahedron, or those having an irregular crystal form, such as spherical or tabular, etc., or may be those having a composite crystal form. They may be composed of a mixture of grains having different crystal forms. Their size can be varied on a wide range, but in general average grain sizes from 0.1 to 4 mm are suitable.

The silver halide emulsions may be obtained according to any of the known acid, neutral and ammoniacal method using conventional precipitation methods such as a single or twin jet method. Further, the silver halide emulsions may be chemically sensitized with a sulfur sensitizer, such as allylthiocarbamide, thiourea, cystine, etc.; an active or inert selenium sensitizer; a reducing sensitizer such as stannous salt, a polyamine, etc.; a noble metal sensitizer, such as gold sensitizer, more specifically potassium aurithiocyanate, potassium chloroaurate, etc.; or a sensitizer of a water soluble salt such as for instance of ruthenium, rhodium, iridium and the like, more specifically, ammonium chloropalladate, potassium chloroplatinate and sodium chloropalladite, etc.; each being employed either alone or in a suitable combination.

Furthermore, the above silver halide emulsions may contain various known additives for photography. For example, there may be employed additives for photography as disclosed in Research Disclosure, Item 17643, December 1978. Specifically hydrophobic photographic additives include dye-forming couplers, development-inhibitor-releasing, (DIR) couplers, silver halide developers, oxidized developer scavengers, spectral sensitizers and desensitizers, diffusion transfer dye image-formers, visible and ultraviolet light absorbers, which are conventionally introduced into hydrophilic colloid layers of photographic elements dispersed in water-immiscible high boiling solvents. Other hydrophobic photographic additives include those used in silver halide photographic elements, such as optical brighteners, antioxidants, silver halide solvents, bleachable dyes and the like. Hydrophobic photographic additives for use in the present invention are described in more details in Research Disclosure 15930, July 1977.

Moreover, the silver halides may be optically sensitized to a desired region of the visible spectrum. The method for spectral sensitization is not particularly limited. For example, optical sensitization may be possible by using an optical sensitizer, including a cyanine dye, a merocyanine dye, complex cyanine and merocyanine dyes, oxonol dyes, hemioxonol dyes, styryl dyes and streptocyanine dyes, either alone or in combination. Particularly useful optical sensitizers are the dyes of the benzoxazole-, benzimidazole- and benzothiazole-carbocyanine type.

The above emulsions may also contain various additives conveniently used depending upon their purpose. These additives include, for example, stabilizers or antifoggants such as azaindenes, triazoles, tetrazoles, imidazolium salts, polyhydroxy compounds and others; film hardeners such as of the aldehyde, aziridine, isoxazole, vinylsulfone, acryloyl, triazine type, etc. type; developing promoters such as benzyl alcohol, polyoxyethylene type compounds, etc.; image stabilizers such as compounds of the chromane, cumarane, bisphenol type, etc. Also, coating aids, surfactants for improved coatability, modifiers of the permeability in the processing liquids, defoaming agents, and matting agents, such as, polymethyl methacrylate beads, may be used if desired. Further, the auxiliary layer may contain a lubricant, such as wax. Suitable lubricants include silicone oil, silicones having polar groups, and the like, as described, for example, in U.S. Pat. No. 5,532,118.

The photographic emulsions can be used for black-and-white light-sensitive negative elements, light-sensitive positive elements, X-Ray elements, lithographic elements, black-and-white and color light-sensitive elements for diffusion transfer processes and light-sensitive elements which contain oil-soluble or water-soluble color couplers.

Preferably, the silver halide emulsions are designed for multicolor elements comprising dye image forming units sensitive to each of the three primary regions (blue, green and red) of the visible spectrum. Each unit can be formed by a single emulsion layer or multiple emulsion layers sensitive to the same spectral region.

More preferably, the silver halide emulsions are designed for a multicolor element comprising a support bearing at least one blue-sensitive silver halide emulsion layer and preferably two blue-sensitive silver halide emulsion layers of different sensitivity associated to yellow dye forming couplers, at least one green sensitive silver halide emulsion layer and preferably at least two green-sensitive silver halide emulsion layers of different sensitivity associated to magenta dye forming couplers, at least one red-sensitive silver halide emulsion layer and preferably at least two red-sensitive silver halide emulsion layers of different sensitivity associated to cyan dye forming couplers, and additional non light-sensitive hydrophilic colloidal layers (such as protective layers, intermediate layers, filter layers, subbing layers, backing layers and the like), wherein at least one component layer of said material comprises incorporated therein a hydrophilic photographic additive dispersed with the aid of a water-immiscible high boiling organic solvent according to the present invention, said component layers comprising preferably at least one silver halide emulsion layer including a dye forming coupler.

The photographic elements can be processed after exposure to form a visible image. Processings can be the common ones employed to develop color photographic elements. A negative colored image can be obtained by color development followed by bleaching and fixing. Development is obtained by contacting the exposed silver halides of the element with an alkaline aqueous medium in the presence of an aromatic primary amine color developing agent contained in the medium or in the material, as known in the art. The aromatic primary amine color developing agents used in the photographic color developing compositions can be any of the known compounds of the class of p-phenylendiamine derivatives, widely employed in various color photographic process. Particularly useful color developing agents are the p-phenylenediamine derivatives, especially the N,N-dialkyl-p-phenylenediamine derivatives wherein the alkyl groups or the aromatic nucleus can be substituted or not substituted.

Examples of p-phenylenediamine developers include the salts of: N,N-diethyl-p-phenylenediamine, 2-amino-5-diethylamino-toluene, 4-amino-N-ethyl-N-(α-methanesulphonamidoethyl)-m-toluidine, 4-amino-3-methyl-N-ethyl-N-(α-hydroxyethyl)-aniline, 4-amino-3-(α-methylsulfonamidoethyl)-N,N-diethylaniline, 4-amino-N,N-diethyl-3-(N'-methyl-α-methylsulfonamido)-aniline, N-ethyl-N-methoxy-ethyl-3-methyl-p-phenylenediamine and the like, as described, for instance, in U.S. Pat. Nos. 2,552,241; 2,556,271; 3,656,950 and 3,658,525.

Examples of commonly used developing agents of the p-phenylene diamine salt type are: 2-amino-5-diethylaminotoluene hydrochloride (gene-rally known as CD2 and used in the developing solutions for color positive photographic materials), 4-amino-N-ethyl-N-(α-methanesulfonamidoethyl)-m-toluidine sesquisulfate monohydrate (generally known as CD3 and used in the developing solution for photographic papers and color reversal materials) and 4-amino-3-methyl-N-ethyl-N-(β-hydroxyethyl)-aniline sulfate (generally known as CD4 and used in the developing solutions for color negative photographic materials).

The color developing agents are generally used in a quantity from about 0.001 to about 0.1 moles per liter, preferably from about 0.0045 to about 0.04 moles per liter of photographic color developing compositions.

In the case of color photographic materials, the processing comprises at least a color developing bath and, optionally, a prehardening bath, a neutralizing bath, a first (black and white) developing bath, etc. These baths are well known in the art and are described for instance in Research Disclosures 17643, 1978, and 308119, Sections XIX and XX, 1989.

After color development, the image-wise developed metallic silver and the remaining silver salts generally must be removed from the photographic element. This is performed in separate bleaching and fixing baths or in a single bath, called "blix", which bleaches and fixes the image in a single step. The bleaching bath is a water solution having a pH equal to 5.60 and containing an oxidizing agent, normally a complex salt of an alkali metal or of ammonium and of trivalent iron with an organic acid, e.g., $EDTA.Fe.NH_4$, wherein EDTA is the ethylenediamino-tetracetic acid, or $PDTA.Fe.NH_4$, wherein PDTA is the propylenediaminotetraacetic acid. While processing, this bath is continuously aired to oxidize the divalent iron which forms while bleaching the silver image and regenerated, as known in the art, to maintain the bleach effectiveness. The bad working of these operations may cause the drawback of the loss of cyan density of the dyes.

Further to the above mentioned oxidizing agents, the blix bath can contain known fixing agents, such as for example ammonium or alkali metal thiosulfates. Both bleaching and fixing baths can contain other additives, e.g., polyalkyleneoxide compounds, as described for example in GB patent 933,008 in order to increase the effectiveness of the bath, or thioether compounds known as bleach accelerators.

The invention will be further illustrated by the following examples.

EXAMPLE 1

Sample 1 (comparison). A biaxially oriented and annealed polyethylene naphthalate support base has been subjected to a corona discharge treatment at 1.5 $J/cm^2$ and was then overcoated with an adhesion promoting layer containing 330 $mg/m^2$ of Neorez™ R551 polyurethane binder, 7.5 $mg/m^2$ of Triton™ X-100, 33 $mg/m^2$ of Silquest™ A187 as adhesion promoter, 1.2 $mg/m^2$ of polymethylmethacrylate beads having an average diameter of 1.5 mm. The adhesion promoting layer has been overcoated by a coating hopper with a silver halide emulsion layer containing 1.3 $g/m^2$ of silver, 2.7 $g/m^2$ of gelatin, 197.3 $mg/m^2$ of dichlorotriazine hardener, 289.1 mg of a magenta masking coupler, 112.0 $mg/m^2$ of Dye 1 and 233.1 $mg/m^2$ of Dye 2.

Sample 2 (invention) has been prepared as Sample 1, but a hydrophilic subbing layer has been coated between the adhesion promoting layer and the emulsion layer. The subbing layer contained 112 $mg/m^2$ of gelatin, 2.25 $mg/m^2$ of chrome alum and 15 $mg/m^2$ of Triton™ X-100.

Sample 3 (comparison) has been prepared as Sample 2, but the Silquest™ A187 adhesion promoter has been removed from the adhesion promoting layer.

Sample 4 (invention) has been prepared as Sample 2, but the Neorez™ R551 polyurethane binder in the adhesion promoting layer has been replaced with Sancure™ 1301 polyurethane binder, in the same amount.

Sample 5 (comparison) has been prepared as Sample 4, but the Silquest™ A187 adhesion promoter has been removed from the adhesion promoting layer.

Sample 6 (invention) has been prepared as Sample 2, but the subbing layer was made of a continuous gelled network of inorganic silica particles containing 37.5 $mg/m^2$ of 3-aminopropyltriethoxysilane compound, 375 $mg/m^2$ of colloidal silica and 7.5 $mg/m^2$ of Triton™ X-100.

Sample 7 (comparison) has been prepared as Sample 6, but the Silquest™ A187 adhesion promoter has been removed from the adhesion promoting layer.

Sample 8 (invention) has been prepared as Sample 6, but the Neorez™ R551 polyurethane binder in the adhesion promoting layer has been replaced with Sancure™ 1301 polyurethane binder, in the same amount.

Sample 9 (comparison) has been prepared as Sample 8, but the Silquest™ A187 adhesion promoter has been removed from the adhesion promoting layer.

Sample 10 (invention) has been prepared as Sample 6, but the Neorez™ R551 polyurethane binder in the adhesion promoting layer has been replaced by Sancure™ 2710 polyurethane binder, in the same amount.

Sample 11 (comparison) has been prepared as Sample 10, but the Silquest™ A187 adhesion promoter has been removed from the adhesion promoting layer.

Sample 12 (comparison) has been prepared as Sample 2, but the Silquest™ A187 adhesion promoter has been replaced, in the same amount, by Denacol™ EX-614B, as described in U.S. Pat. No. 5,378,592.

Sample 13 (comparison) has been prepared as Sample 2, but the Neorez™ R551 polyurethane binder in the adhesion promoting layer has been replaced by Carboset™ GA2136, a non-polyurethane binder, in the same amount.

Sample 14 (comparison) has been prepared as Sample 6, but the Neorez™ R551 polyurethane binder in the adhesion promoting layer has been replaced by Carboset™ GA2136, a non-polyurethane binder, in the same amount.

Neorez™ R551 is the commercial name of an aqueous dispersion of an aliphatic polyurethane binder sold by Zeneca Resins.

area and the tape is pulled off by hand. The amount of adhesion has been ranked using scholastic scores from 0 (no adhesion) to 10 (excellent adhesion).

Wet Adhesion Test: A 35 mm strip of the coating has been scored with a razor blade as above and placed in small troughs filled with developing, bleaching and fixing solutions. A weighted filled natural rubber pad has been placed on top and repeatedly moved back and forth across the strip, with a pressure of 1.5 Kg on the strip. The same scholastic scores of above have been used.

Dry Adhesion Test After Development: the same dry adhesion test of above has been repeated after having developed and dried the sample at 40° C.

The results are reported in the following Table 1.

TABLE 1

| | Subbing layer | | | | | | |
|---|---|---|---|---|---|---|---|
| Samples | Hydrophilic colloid | Gel network of inorganic particles | Silane compound in adhesion promoting layer | Polyurethane Binder | Dry Adhesion Test | Wet Adhesion Test | Dry Adhesion Test After Development |
| Sample 1 (comp.) | NO | NO | YES | YES | 5 | 0 | 5 |
| Sample 2 (inv.) | YES | NO | YES | YES | 10 | 10 | 10 |
| Sample 3 (comp.) | YES | NO | NO | YES | 0 | 0 | 0 |
| Sample 4 (inv.) | YES | NO | YES | YES | 10 | 10 | 10 |
| Sample 5 (comp.) | YES | NO | NO | YES | 2 | 0 | 2 |
| Sample 6 (inv.) | NO | YES | YES | YES | 10 | 10 | 10 |
| Sample 7 (comp.) | NO | YES | NO | YES | 9 | 0 | 7 |
| Sample 8 (inv.) | NO | YES | YES | YES | 10 | 10 | 10 |
| Sample 9 (comp.) | NO | YES | NO | YES | 4 | 0 | 7 |
| Sample 10 (inv.) | NO | YES | YES | YES | 10 | 10 | 10 |
| Sample 11 (comp.) | NO | YES | NO | YES | 4 | 2 | 7 |
| Sample 12 (comp.) | YES | NO | NO | YES | 2 | 0 | 0 |
| Sample 13 (comp.) | YES | NO | YES | NO | 3 | 7 | 3 |
| Sample 14 (comp.) | NO | YES | YES | NO | 2 | 9 | 4 |

Sancure™ 1301 and Sancure™ 2710 are the commercial names of aqueous dispersions of aliphatic polyurethane binders sold by BF Goodrich.

Triton™ X-100 is the trade name of a non-ionic surfactant of the alkylphenoxyethylene type, sold by Union Carbide Co., Dambury, Conn., USA, corresponding to the following formula:

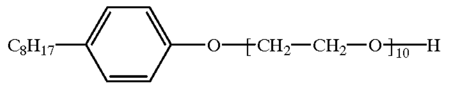

Silquest™ A187 is the trade name of the 3-glycidyloxypropyl trimethoxysilane compound, sold by Osi Specialties.

Denacol™ EX-614B is a sorbitol polyglycidyl ether, sold by Nagase Chemicals; LTD.

Carboset™ GA2136 is a vinyl addition polymer produced by BF Goodrich Co.

Samples 1–14 have been incubated (2 hours, at 38° C. and 50% RH) and evaluated as regards both wet and dry adhesion in the following manner.

Dry Adhesion Test: A 35 mm strip of the coating has been scored with a razor blade in a grid pattern (5 lines, 5 mm apart and another 5 lines at a 60° angle to the first set). A piece of 610 Scotch™ tape has been applied over the scored Table 1 shows that comparison Sample 1, even if containing a silane compound in the adhesion promoting layer, is not useful to the purpose of the present invention because it presents bad dry and wet adhesion performances, caused by the absence of a subbing layer positioned between the adhesion promoting layer and the emulsion layers. Neither comparison samples Nos. 3, 5, 7, 9 and 11 are useful to the purpose of the present invention because they too present bad adhesion values, caused by the absence of a silane compound in the adhesion promoting layer, even if they do contain a subbing layer positioned between the adhesion promoting layer and the emulsion layers (Samples 3 and contained a hydrophilic colloid type subbing layer, while Samples 7, 9 and 11 contained a subbing layer made of gel network of inorganic particles).

Comparison Sample No. 12, containing an epoxy compound disclosed in U.S. Pat. No. 5,378,592 instead of the silane compound useful in the adhesion promoting layer of the present invention, also shows bad dry and wet adhesion values. Comparison Samples Nos. 13 and 14 are not useful to the purpose of the present invention because they present bad adhesion performances, caused by the absence of a polyurethane binder, even if both containing a silane compound in the adhesion promoting layer and a subbing layer positioned between the adhesion promoting layer and the emulsion layers.

Only Samples 2, 4, 6, 8 and 10 show good wet and dry adhesion performances, due to the contemporaneous presence of a silane compound and of a polyurethane binder in the adhesion promoting layer and of a subbing layer positioned between the adhesion promoting layer and the emulsion layers.

Dye 1

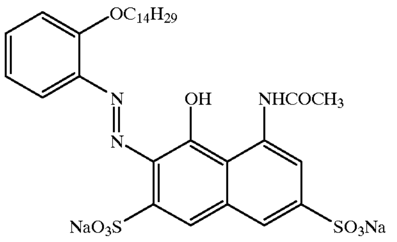

Dye 2

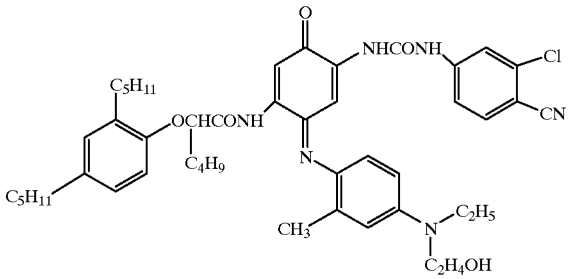

EXAMPLE 2

Sample 15 (invention). A biaxially oriented and annealed polyethylene naphthalate support base has been subjected to a corona discharge treatment at 1.5 J/cm$^2$ and then overcoated with an adhesion promoting layer containing 330 mg/m$^2$ of Sancure™ 1301 polyurethane binder, 7.5 mg/m$^2$ of Triton™ X-100, 33 mg/m$^2$ of Silquest™ A187 as adhesion promoter, 1.2 mg/m$^2$ of polymethylmethacrylate beads having an average diameter of 1.5 mm. The adhesion promoting layer has been then overcoated with an antistatic layer containing 6.2 mg/m$^2$ of vanadium pentoxide, 500 mg/m$^2$ of Daran™ SL 112 (a vinylidene chloride-acrylonitrile-methylmethacrylate copolymer) and 10 mg/m$^2$ of Triton™ X-100. The antistatic layer has been then overcoated by a transparent magnetic layer containing 57 mg/m$^2$ of iron oxide particles, 1 g/m$^2$ of cellulose diacetate, 16 mg/m$^2$ of alumina and minor amounts of additional components.

Sample 15 has been evaluated as previous Samples 1–14 obtaining the following good adhesion results:

| | |
|---|---|
| Dry wet adhesion | 10 |
| Wet adhesion | 10 |
| Dry adhesion after development | 9 |

What is claimed is:

1. A photographic element comprising:

a film support base optionally comprising a primer layer, an adhesion promoting layer, a subbing layer, and at least one light-sensitive silver halide emulsion layer, wherein the adhesion promoting layer is adjacent to the support and comprises a mixture of a silane compound and a polyurethane binder, and the subbing layer is a layer comprising a continuous gelled network of inorganic particles, and is positioned between the adhesion promoting layer and the emulsion layer.

2. The photographic element of claim 1, wherein the silane compound is an ambifunctional silane represented by the following formula:

$$(Q)_n\text{—R—SI(OR')}_3$$

wherein R' is alkyl or aryl; R is an organic group with (n+1) bonds or valences; n is 1, 2, or 3; and Q is a moiety capable of bonding with the support or the primer layer on the support.

3. The photographic element of claim 1, wherein the silane compound is an epoxy-silane compound or an amino-silane compound.

4. The photographic element of claim 1, wherein the silane compound is selected from the group consisting of γ-glycidoxypropyl-trimethoxy-silane and a β-(3,4-epoxycyclohexyl)ethyl-trimethoxy-silane compound.

5. The photographic element of claim 1, wherein the adhesion promoting layer contains a polyurethane binder to silane compound ratio in the range from about 1:1 to about 100:1.

6. The photographic element of claim 1, wherein the adhesion promoting layer contains a polyurethane binder to silane compound ratio in the range from about 5:1 to about 50:1.

7. The photographic element of claim 1, wherein the hydrophilic colloid subbing layer is made of gelatin.

8. The photographic element of claim 1, wherein said inorganic particles are silica compounds.

9. The photographic element of claim 1, wherein the film support base is a polyester support.

10. A photographic element comprising a film support base optionally comprising a primer layer having coated on one side thereof at least one light-sensitive silver halide emulsion layer and on the opposite side thereof an adhesion promoting layer and at least one auxiliary layer, wherein the adhesion promoting layer is closer to the support than the auxiliary layer and contains a mixture of a silane compound and a polyurethane binder.

11. The photographic element of claim 10, wherein the auxiliary layer is selected from the group consisting of an antistatic layer, a magnetic layer, a protective layer, and a lubricant layer.

12. The photographic element of claim 10, wherein the silane compound is an ambifunctional silane represented by the following formula:

$$(Q)_n\text{—R—SI(OR')}_3$$

wherein R' is alkyl or aryl; R is an organic group with (n+1) bonds or valences; n is 1, 2, or 3; and Q is a moiety capable of bonding with the support or the primer layer on the support.

13. The photographic element of claim 10, wherein the silane compound is an epoxysilane compound or an amino-silane compound.

14. The photographic element of claim 10, wherein the silane compound is a γ-glycidoxypropyl-trimethoxy-silane or a β-(3,4-epoxycyclohexyl)ethyl-trimethoxysilane compound.

15. The photographic element of claim 10, wherein the adhesion promoting layer contains a polyurethane binder to silane compound ratio in the range from about 1:1 to about 100:1.

16. The photographic element of claim 10, wherein the adhesion promoting layer contains a polyurethane binder to silane compound ratio in the range from about 5:1 to about 20:1.

17. The photographic element of claim 10, wherein the film support base is a polyester support.

18. A film support base having coated on at least one side thereof an adhesion promoting layer and a subbing layer, wherein the adhesion promoting layer is closer to the support than the subbing layer and contains a mixture of a silane compound and a polyurethane binder, and the subbing layer comprises a continuous gelled network of inorganic particles.

19. A film support base having coated on at least one side thereof an adhesion promoting layer and at least an auxiliary layer, wherein the adhesion promoting layer is closer to the support than the auxiliary layer and contains a mixture of a silane compound and a polyurethane binder and the auxiliary layer is an antistatic layer, a magnetic layer or a lubricant layer.

20. A photographic element comprising:

a polyester film support base, an adhesion promoting layer, a subbing layer, and at least one light-sensitive silver halide emulsion layer, wherein the adhesion promoting layer is adjacent to the support and comprises a silane compound and a polyurethane binder, and the subbing layer is selected from the group consisting of a hydrophilic colloid layer and a layer comprising a continuous gelled network of inorganic particles, is positioned between the adhesion promoting layer and the emulsion layer.

* * * * *